H. J. ROUND.
WIRELESS SIGNALING APPARATUS.
APPLICATION FILED MAR. 24, 1921.
1,395,987.
Patented Nov. 1, 1921.
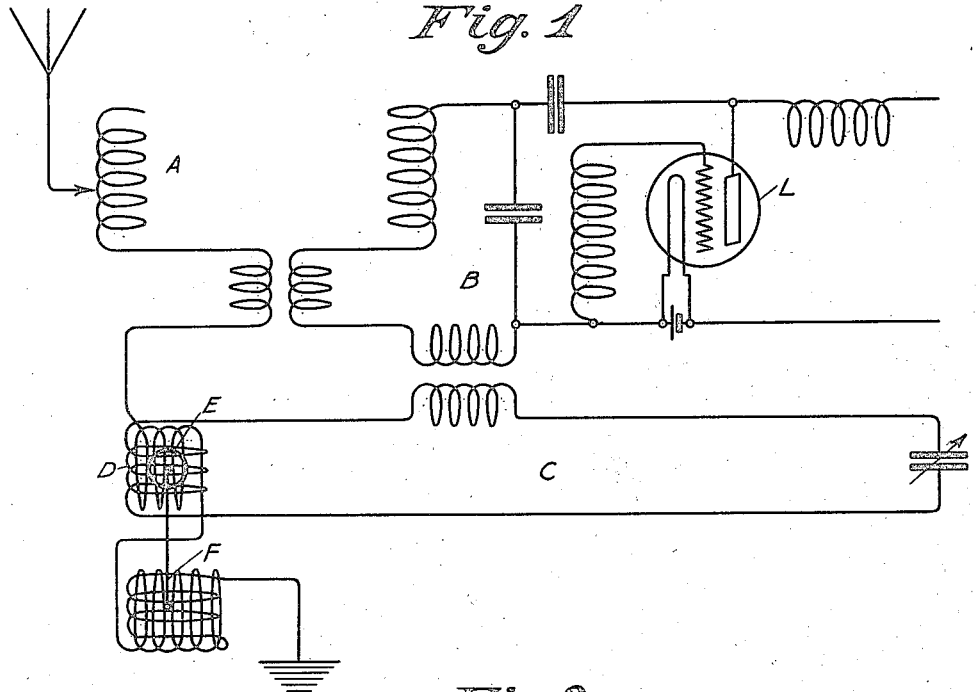
Fig. 1
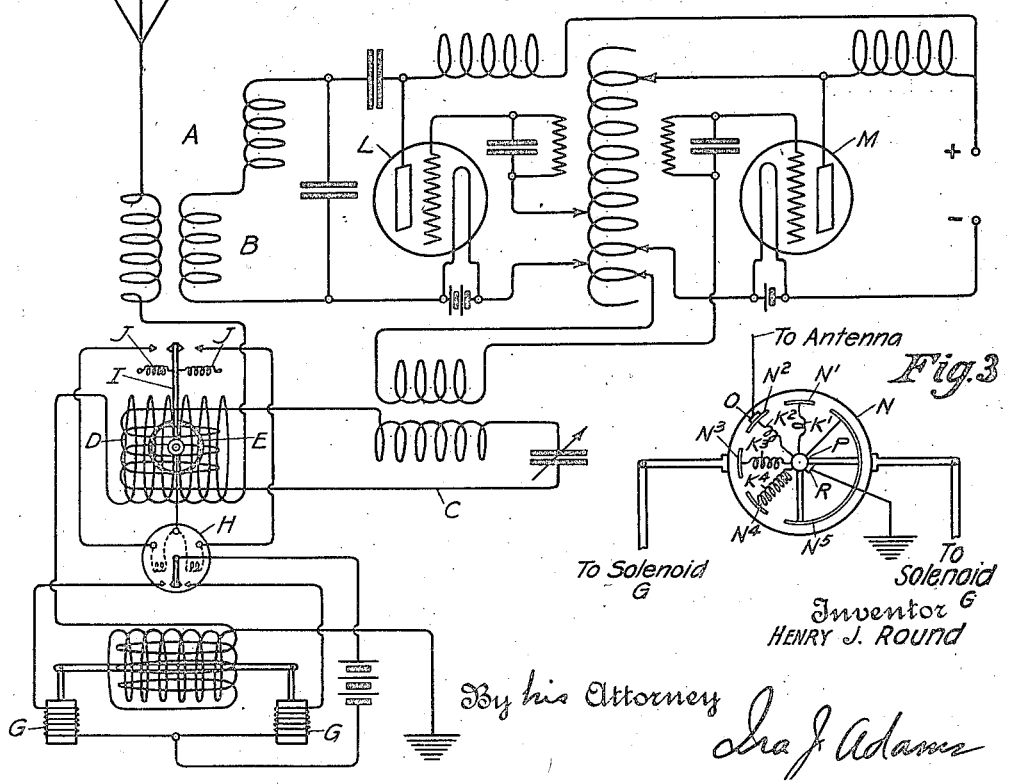
Fig. 2
Fig. 3
Inventor
HENRY J. Round
By his Attorney
Ira J. Adams

UNITED STATES PATENT OFFICE.

HENRY JOSEPH ROUND, OF LONDON, ENGLAND, ASSIGNOR TO RADIO CORPORATION OF AMERICA, OF NEW YORK, N. Y., A CORPORATION OF DELAWARE.

WIRELESS SIGNALING APPARATUS.

1,395,987.   Specification of Letters Patent.   Patented Nov. 1, 1921.

Application filed March 24, 1921. Serial No. 455,232.

*To all whom it may concern:*

Be it known that I, HENRY JOSEPH ROUND, a subject of the King of Great Britain, residing at 9 Woodberry Crescent, Muswell Hill, London, England, have invented new and useful Improvements in Wireless Signaling Apparatus, (for which I have filed application in Great Britain March 11, 1920), of which the following is a specification.

When using an aerial loosely coupled with the primary circuit of a valve, alternator, arc, or the like, it is necessary to keep the wave length of the aerial constant, otherwise the amplitude of the aerial current will vary. This is particularly so with slightly damped aerials heavily loaded with coils, for the effect of wind on the aerial may change the tuning quite seriously.

The object of this invention is to provide means whereby the wave length of an aerial may be kept constant automatically.

With this object I combine an aerial or a circuit whose period varies with that of the aerial and a closed oscillatory circuit which has a period dependent on that of primary circuit with a small rotating field motor comprising two windings and I connect one winding in the closed circuit and the other winding in the aerial circuit or circuit whose period varies with that of the aerial.

If the aerial is exactly in tune with the closed circuit, then there will be no rotating field produced by the two windings at right angles, but if the aerial increases its wavelength, the phase of the aerial current will tend to produce a rotating field in one direction, whereas if the aerial decreases its wavelength, the rotating field will be in the other direction.

The rotation of the shaft of the armature of the rotating field motor therefore can be utilized to control a variometer, a variable condenser, or other means for varying the period of the aerial and I so connect the latter with the rotor that when the aerial increases its wave length, the variometer decreases it until there is no longer any rotating field and vice versa, so that the wave length of the aerial is kept practically constant.

Obviously a relay or other controlling means, such as an electromagnetic relay can be interposed to work the variometer, etc. One of the windings of the rotating field motor may be in a circuit coupled to the primary circuit or in a circuit coupled to an independent circuit feeding the grids of valves if such an independent circuit is being used.

Instead of a continuously moving variometer, the rotor can be arranged to work a relay so as to vary the aerial in small jumps. Thus if the wavelength of the aerial decreases, the rotor makes a contact which inserts an inductance in the aerial when the relay will return to rest ready to act again in either direction.

The invention is illustrated by way of example in the accompanying drawing in which:

Figure 1 represents diagrammatically a transmitting system.

Fig. 2 is a modification and Fig. 3 a detail view.

A is an aerial circuit which may get its natural period changed by external causes. B is an oscillatory circuit with valves and power attached in any suitable manner. C is an oscillatory circuit coupled to B and tuned to the same frequency. D is the stator of an asynchronous motor of which E is the rotor, D comprising two windings at right angles, one in the aerial circuit and the other in the circuit C.

No rotating field is produced in E if both A and C are in tune with B, but if A varies either to a shorter or longer wave length, a rotating field is set up in one direction or another and E moves accordingly. On the shaft of E is a variometer F in series with the aerial. This variometer is so connected as to increase or decrease the impedance with the rotation of E so as to counterbalance and annul the rotating field by bringing A and B to the same period, the system then coming to rest.

As this arrangement will use up a large amount of high frequency power it is therefore of advantage to interpose between E and F some form of relay which can be operated with small amounts of energy. Such an arrangement is illustrated in Fig. 2.

It is also of advantage, when using this arrangement, to employ an independent drive, as illustrated in Fig. 2; that is, to supply the grid control of the power valves L from a separate or master oscillator M, as with a coupled circuit some slight changes of wave length and phase are always caused when the aerial circuit has its tune changed and this cannot occur with the independent drive.

When using the "independent drive," arrangements have to be made by trial to set the phases right so that no rotating field is produced when the aerial setting is correct. This can be done on the tuning condenser of circuit C which will be then coupled to the independent drive instead of to the circuit B.

Fig. 2 also shows an arrangement in which a relay is interposed between the motor and the variometer. The latter is actuated by solenoids G, G, controlled by a relay H actuated by a contact arm I which is mounted on the shaft of the rotor E and controlled by springs J, J.

The relay H instead of working a variometer may be caused to add or subtract small inductances until the relay contacts fall back, for example, by causing the coils $K^1$, $K^2$, $K^3$, $K^4$, to be connected in the antenna circuit when the solenoids G, G are moved into various positions. The coils may be mounted on a drum N, having segments $N^1$, $N^2$, $N^3$, $N^4$, $N^5$ for contacting with a brush O, and a slip ring P making contact with a brush R connected in the antenna circuit. This arrangement is shown in Fig. 3.

Having described my invention, what I claim is:

1. The combination with an aerial and a closed circuit of a rotating field motor comprising two windings, one in the aerial circuit and the other in the closed circuit and means actuated by the motor for keeping the period of the aerial constant.

2. The combination with an aerial and an oscillation circuit coupled thereto, said aerial and oscillation circuit being normally tuned to the same frequency, a rotating-field motor comprising a winding in each of two circuits having at all times the frequency of the aerial and oscillation circuit, said windings being adapted to coöperate to produce a rotating magnetic field for rotating the armature of the motor whenever the frequency of the aerial and oscillation circuit is caused to differ, and means operated by said motor for equalizing the frequencies of said aerial and oscillation circuit.

3. The combination with an aerial and an oscillation circuit coupled thereto, said aerial and oscillation circuit being normally tuned to the same frequency, a rotating-field motor comprising a winding in each of two circuits having at all times the frequency of the aerial and oscillation circuit, said windings being adapted to coöperate to produce a rotating magnetic field for rotating the armature of the motor whenever the frequency of the aerial and oscillation circuit is caused to differ, and means operated by said motor for maintaining the frequency of said aerial circuit equal to that of the oscillation circuit.

4. The combination with an aerial and an oscillation circuit coupled thereto, said aerial and oscillation circuit being normally tuned to the same frequency, a rotating-field motor comprising a winding in said aerial circuit, a second winding in a circuit having the same frequency as the oscillation circuit, said windings being adapted to coöperate to produce a rotating magnetic field for operating the motor whenever the frequency of the aerial and oscillation circuit is caused to differ, and means operated by said motor for maintaining the frequency of the aerial circuit equal to that of the oscillation circuit.

5. The combination with an aerial and an oscillation circuit coupled thereto, said aerial and oscillation circuit being normally tuned to the same frequency, a rotating-field motor comprising a winding in each of two circuits having at all times the frequency of the aerial and oscillation circuit and adapted to coöperate to produce a rotating field for operating the motor whenever the frequency of the aerial is caused to differ, an electromagnetic relay adapted to be operated by said motor and means operated by said electromagnetic relay for equalizing the frequencies of the aerial and oscillation circuit.

6. The combination with an aerial and an oscillation circuit coupled thereto, said aerial and oscillation circuit being normally tuned to the same frequency, a rotating-field motor comprising a winding in a circuit having the same frequency at all times as the aerial and a second winding in a second oscillation circuit, means for controlling the frequency of the first and second oscillation circuits, said winding being adapted to coöperate to produce a rotating magnetic field for operating the motor whenever the frequency of the aerial and oscillation circuits is caused to differ and means operated by said motor for equalizing the frequencies of the aerial and the first and second mentioned oscillation circuits.

7. In combination of an aerial, a circuit associated therewith, a variometer for adjusting the period of the aerial and means for maintaining the period of the aerial consonant comprising a coil in the aerial, a coil in said circuit and means actuated by relative variations in the currents in said coils for operating said variometer when the wave length of the aerial changes.

HENRY JOSEPH ROUND.